(12) United States Patent
Beyer, Jr.

(10) Patent No.: US 7,031,728 B2
(45) Date of Patent: Apr. 18, 2006

(54) CELLULAR PHONE/PDA COMMUNICATION SYSTEM

(76) Inventor: Malcolm K. Beyer, Jr., 92 Lighthouse Dr., Jupiter Inlet Colony, FL (US) 33469-3504

( * ) Notice: Subject to any disclaimer, the term of this patent is extended or adjusted under 35 U.S.C. 154(b) by 0 days.

(21) Appl. No.: 10/711,490

(22) Filed: Sep. 21, 2004

(65) Prior Publication Data

US 2006/0063539 A1    Mar. 23, 2006

(51) Int. Cl.
*H04Q 7/20* (2006.01)

(52) U.S. Cl. ............... 455/456.3; 455/457; 455/420

(58) Field of Classification Search ........... 455/456.3, 455/418, 456.1, 419, 556.2, 420, 88, 41.2, 455/41.3, 416, 414.4, 412.2–412.1, 415, 455/457, 404.2, 442.1, 427, 431, 500, 517, 455/518, 519, 516, 564, 458, 463
See application file for complete search history.

(56) References Cited

U.S. PATENT DOCUMENTS

| | | | | |
|---|---|---|---|---|
| 5,555,286 A | * | 9/1996 | Tendler | .............. 455/404.2 |
| 6,204,844 B1 | * | 3/2001 | Fumarolo et al. | .......... 715/736 |
| 6,542,475 B1 | * | 4/2003 | Bala et al. | .............. 370/271 |
| 6,775,560 B1 | * | 8/2004 | King et al. | ............... 455/566 |
| 6,868,337 B1 | * | 3/2005 | Muramatsu | .............. 701/211 |
| 2001/0044321 A1 | * | 11/2001 | Ausems et al. | .......... 455/556 |
| 2003/0139150 A1 | | 7/2003 | Rodrigues et al. | |
| 2004/0192331 A1 | * | 9/2004 | Gorday et al. | .......... 455/456.1 |
| 2004/0266456 A1 | * | 12/2004 | Bostrom et al. | ........ 455/456.3 |
| 2005/0130634 A1 | * | 6/2005 | Godfrey | ................ 455/414.1 |

* cited by examiner

*Primary Examiner*—Aung Moe
(74) *Attorney, Agent, or Firm*—Malin, Haley & DiMaggio, P.A.

(57) ABSTRACT

A cellular PDA communication system for allowing a plurality of cellular phone users to monitor each others' location and status, to initiate cellular phone calls by touching a symbol on the display screen with a stylus or finger which can also include conferencing calling. The system also provides for remote activation of a cellular phone by an initiator causing the remote cellular phone to annunciate audio announcements, to call another phone number, to increase the volume of the speaker, to vibrate or to display images or videos. All this is accomplished with a conventional cellular phone PDA that includes GPS navigation with an enhanced improved software program.

15 Claims, 3 Drawing Sheets

CELLULAR PHONE/PDA COMMUNICATION SYSTEM

FIELD OF THE INVENTION

This invention relates generally to an integrated communications system using a plurality of cellular PDA/GPS phones for the management of a group of people through the use of a communications net and, specifically, provide each user with a cellular phone that has features that permit all the users to know each other's locations and status, to rapidly call and communicate data among the users by touching display screen symbols and to enable the users to easily access data concerning other users and other database information.

DESCRIPTION OF RELATED ART

The purpose of a communications system is to transmit information bearing signals from a source, located at one point, to a user destination, located at another point some distance away. A communications system is generally comprised of three basic elements: transmitter, information channel and receiver. One form of communication in recent years is cellular phone telephony. A network of communication cells set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include Global Positioning System (GPS) navigation that utilizes satellite navigation. These devices thus unite cellular phone cellular technology with navigation information and computer information transmission and receipt of data.

Digital SMS (Smart Message Service) and TCP/IP messages can be transmitted using cellular technology such as the various versions of GSM and CDMA or via a WiFi local area network. One implementation of these GPS location reporting cellular systems is for the data to go to a central site where the information is displayed for a person to monitor the locations of the units that have the combined GPS cellular phone. Another implementation permits the cellular phone users to also view the location of other GPS equipped units. A drawback of the current implementation is that these systems are either all on or all off. There is no way to selectively activate participants or to stop the participants from participating in the network Another drawback of the use of the current combined cellular phone PDA technology is that when using the PDA to display a map (that also may depict georeferenced businesses, homes and other facilities' locations and phone numbers), and the operator wants to place a call, the cellular phone/PDA operator is required to obtain the phone number by touching the display screen at the correct location of that entity on the map to obtain the phone number, then the operator has to memorize the phone number, then go to a different display to enter the phone number, to make the call and then, if desired, go back to the map display. Needless to say, this is a cumbersome process. Sending a text message to a location, business, home or facility that appears on a PDA map display to another cellular phone can also be a cumbersome process as the PDA operator has to find the phone number on the map display, memorize the phone number, then go to a different display to enter a text message, enter the text message, send the text message and then shift back to the map display program. Furthermore, for a phone to send data concerning a new entity of interest (car, person, tank, accident, or other entity) the operator must type in the information and the latitude and longitude of the entity.

In spite of the rapid advance in cellular phone technology, it would also be desirable to actuate a remote cellular phone to annunciate an audio message to alert the remote user that there is an emergency (or for another reason) and that the calling cellular phone should be called immediately. Furthermore, it would be desirable to cause the remote phone to display a text message, photograph, video clip or video transmission, to announce the caller's name and to be able to control a remote phone and cause the remote phone to call another phone number (as an example, to automatically establish an 800 number conference call), to vibrate, or increase the loudness of an announcement without any action by the remote phone operator.

The present software invention overcomes many of these problems shown in the prior art by providing a cellular phone/PDA/GPS user: a) the ability to selectively poll each of the other PDA/GPS phones to start reporting their positions and status information directly to all or selected users equipped with cellular phone/PDA communication/GPS system in the communications net so that each of the systems that the data is transmitted to is provided a display of the location, status and other information of the other users; b) the ability to exchange other entities of interest information and to assign these entities a category (car, person, tank, accident, or other entity) by touching the display screen at their locations on the map, and selecting the appropriate category switch; c) the ability to make rapid voice and data call initiation to locations, businesses, homes and facilities whose phone number is available in a georeferenced database including the cellular phone/PDA/GPS systems in a communications net by touching the display screen at the appropriate location on the PDA display and selecting a call switch; d) the ability to make rapid voice and data conference call initiation to locations, businesses, homes and facilities whose phone number is available in a georeferenced database including the cellular phone/PDA/GPS systems in a communications net by touching the display screen at the appropriate locations on the PDA display and selecting a conference call switch; e) the ability to remotely control from one cellular phone/PDA/GPS any of the other cellular phone/PDA/GPS systems phones including the ability to control remote cellular phones to make verbal prerecorded announcements, place return calls, place calls to another phone number, vibrate, execute text to speech software, change sound intensity and process and display information by touching the display screen at their location on the PDA display and selecting the appropriate switch; and f) the ability to layer a sufficient number of switches or buttons on the PDA display to perform the above functions without overlaying the map.

U.S. Patent Application No. 2003/0139150 published Jul. 24, 2003 shows a portable navigation and communication system. In one embodiment, the system combines within a single enclosure a GPS satellite positioning unit, mobile telephony using cellular phone technology and personal computing capable of wired or wireless internet or intranet access using a standard operating system. The purpose of this invention is to provide portable navigation for an individual. However, to operate the device, one still needs to utilize a keypad with the telephone functions. U.S. Patent Application No. 2003/0139150 described a wireless communication operating the PDA in a conventional manner. There is no provision for displaying the location of other similarly equipped systems. There is no provision to cause other similarly equipped cellular phone PDA users to transmit their location. There is no provision for entering other entities of interest by touching the display screen at their locations on a map. There is no provision for making a telephone call by touching the display screen at a net participant's symbol to initiate automatically the telephone call to that user or by touching multiple symbols to make conference calls. There is no provision for sending text messages, photographs or videos by touching the net participant(s)' symbol(s) on the display screen to automatically send text messages, photographs or videos to that participant or participants. There is no description or disclosure of a procedure to cause digital messages to be sent to a remote cellular phone that would cause the cellular phone to make verbal announcements, increase sound intensity, vibrate or to call back or to call another phone number. There is no description of the uses of layered soft switches which confine the switches to a particular vicinity of the PDA's display screen.

SUMMARY OF THE INVENTION

A method and system employing cellular telephone communications to provide the location information to a group of geographically dispersed people, and to enable the rapid transmission of data concerning entities of interest to the members of the group and to coordinate the activities of the group through data and voice communications. Each of the cellular telephones includes a visual display with a touch screen, a global positioning system (GPS) receiver and navigation display, a CPU, memory, power supply, battery, microphone, speaker and commercially available software. To this is added: a) communications data and voice exchange software, b) a map database and a database of geographically referenced fixed locations including military bases, homes, businesses, government facilities, street locations and the like, each with a specified latitude and longitude, along with, if available, phone numbers that are associated with of each of these entities, c) another database with the constantly updated GPS location and status of all the software equipped cellular phone/PDA/GPS systems that are part of the communications net.

Each cellular phone/PDA/GPS system is identified on the display of the other phone systems by a symbol that is generated to indicate its identity. The symbol is placed at the correct geographical location and is correlated with the map on the display. Each cellular phone/PDA/GPS System may enter other entities (locations of people, vehicles, buildings, facilities, and other entities) into its database. This information can be likewise transmitted to all the other participants on the communications net. The map, fixed entities, and cellular phone/PDA/GPS System communications net participants' latitude and longitude information is related to the display x, y display locations by a mathematical correlation algorithm.

When the cellular phone/PDA/GPS System user uses his stylus or finger to touch one or more of the symbols or a location on the cellular phone display, the system's software causes the status and latitude and longitude information concerning that symbol or location to be displayed.

To operate the present invention, the operator ("cellular phone one" or "phone one") starts the system by selecting the software which causes: a) the cellular phone to initiate (if it has not already been activated), b) the GPS interface to be established, c) a map of the geographic area where the operator is located and operator's own unit symbol to appear at the correct latitude and longitude on the map, d) the locations of people, vehicles, buildings, and the like that are part of the database appear as symbols on the map, e) the system selected item read out area (which provides amplification information for the communications net participant or object that has been touched on the display screen) to appear on the display, f) an insert area that contains various varying data including: the list of net participants, a list of messages to be read, an indication of what portion of the map is being displayed in major area and other information to appear on the display, and g) a row of primary software created "soft switches" that are always present on the display. One of these soft switches when touched causes a matrix of software driven layered switches (soft switches) to appear on the display in place of the readout and insert areas. Some of these soft switches, when touched, cause the system's functions to occur. Other soft switches cause yet another layer of soft switches to appear, replacing those that were previously displayed. The operator is provided an indication of where the operator is in the layer of switches, and is able to return to the previous layer or to cause the layered switches to disappear and only the basic switches to remain. The operator can also use the phone's hardware pointing device (Navigation Pad) to control the soft switches. By using these soft switches, and hard switches that are part of the cellular phone, the operator can activate different maps, change map scales, select which fixed entities are desired to be displayed, display the information concerning the symbol the operator has touched, initiate phone voice calls, send messages (text, photographs and videos), enter symbols and information representative of other entities, view the locations and statuses of the other communications net participants, establish conference calls, pre-establish conference sub-nets that, when activated, cause all the phone numbers that are specified to be conferenced for voice, text and photograph and video communications, and transmit messages to remote phones which cause the remote phones to make calls, verbal announcements, vibrate, increase sound levels and other functions. To initialize the communications net, the cellular phone one operator selects, from a list, the other users (or all of them), that the operator desires to be part of the communications net. The system then polls the selected phones to activate and become part of the communications net. The selected phones then transmit their positions to all the other phones in the established net. Through interaction with one or more other software enabled cellular phones, symbols are generated on the operators' displays based on the participants' latitude and longitude that is exchanged between the cellular phones. The transmission of this information is based on an algorithm that considers time and or movement or upon a polling request. Each of the communication net symbols on the display represent a different cellular phone remote from cellular phone one. Each of the cellular phones has the phone numbers of all the phones in the communications net in its database. Each of the phones also has in its database the pre-established phone numbers for the fixed locations: people, buildings, facilities, military bases, and other desired locations that can be called in its database. The touch screen provided with the LCD display in the cellular phone includes x, y coordinates that are correlated with the map on the cellular phone display and the geographic location of the fixed sites and the cellular phones in the communications net. Each cellular phone can enter objects of interest by touching the display screen at the object's location on the display screen map. The operator can then assign these objects a category (car, person, tank, accident, or other category). The latitude and longitude of these objects along with their category and other information is then sent on the communications network. Because each of the receiving telephone units has software that automatically converts the received data to the correct map location, the transmitted symbols appear at the correct location without operator intervention and their category information is available by touching the symbol on the display screen.

Each cellular phone/PDA/GPS has the communications hardware along with the circuitry in software to initiate a voice telephone call or transmit data messages, photographs, or videos by touching the screen with a stylus or finger at the symbol location displayed on the screen of the desired phone to be called and then selecting the "call" software switch on the display touch screen. The software will then cause the cellular phone to call to the specific phone number represented by the symbol on the screen. This is done automatically. This action alleviates completely the necessity of actually looking up a phone number and manually entering the phone numbers required to make a cellular phone call.

A further benefit of the present invention is that more than one symbol can be specified to receive a cellular phone voice call and or data call, thus automatically conferencing them. The operator of the cellular phone can conference a small number of phones by touching the display screen locations of the communications net participant symbols that the operator wishes to conference by selecting a "conference" soft switch. This action will then cause the selected units to be conferenced together. The conference call can be expanded to a greater number of users by providing additional software that would conference phones by sending a digital message to the remote cellular phones from the operator cellular phone causing each of the remote cellular phones to dial a specified 800 conference call number and enter each individual phone participant code. The originator phone calls the same number and automatically enters the originator host code. Once all the phones have dialed the 800 number and entered their appropriate participant and host numbers, the conference call will be established. Furthermore, the operator of cellular phone one can pre-establish conference nets for voice and data exchange by either selecting them from a list or a table or by touching the display screen locations of the communication net participant symbols that the operator wishes to conference and selecting a "conference net" soft switch. Once the operator has done that, the software associates those communication net participants as being part of an established conference net. When the cellular phone operator chooses to call all the net participants, all the operator has to do is to select the designated software switch for that net to conference the pre-selected conference participants together. That action will then place a call to all the conferences without further action. This method of conference calling can be also used to send text messages, photographs and videos.

Another embodiment of the invention can include a unique feature in which cellular phone one can send a digital message using SMS, TCP/IP or another protocol to another cellular phone on the communications net by touching a display screen symbol on the geographical screen and then selecting the appropriate software switch to transmit a digital message that would then remotely activate a program in the remote cellular phone to play a recorded audio file to announce an emergency and that a call to cellular phone one is required immediately. Since each of the remote cellular phones has the same software as cellular phone one and includes a PDA and the ability to receive digital messages, the ability to control remote cellular phones to make verbal announcements, display images, place return calls, place calls to another phone number, vibrate, change sound intensity and process and display pre-stored data, images and video can be achieved.

In accordance with the present invention, a multiple cellular phone communication network is set up using the invention. Each cellular phone contains the same software and circuitry that includes cellular phone technology, GPS navigation technology, and a PDA for displaying maps, georeferenced symbols, and data concerning symbols of interest and software created soft switches, transmitting and receiving digital SMS, TCP/IP and other protocol messages. To establish each other's communication net IP addresses, the cellular phones first exchange SMS messages (or use another method) that identifies their IP addresses. Each phone then transmits to all others its location and status in accordance with an established algorithm that is based on time and or movement. Each cellular phone is also able to poll the other cellular phones to transmit their locations. Each user is able to transmit to all the other users: text messages, photographs and videos. Using the present invention, a cellular telephone network can be set up in which all of the parties in the network have almost automatic and instant access to and status of any and all other parties in the network by touching the display screen symbol of the party he desires to initiate voice and data calls, thus, instantly activating the calls. This is an immense time saver in dealing with a cellular phone network for all the parties combined.

It is an object of this invention to provide an improved cellular telephone communication network among a plurality of cellular phones for greatly increasing the call up and initiation speed of each of the cellular phones with each other.

And yet another object of this invention is to enable each participant to automatically exchange IP addresses using SMS or another digital message format.

And yet another object of this invention is to enable each participant in the communications net to poll the other net participants to report or cease reporting their locations and status on the communication net.

And yet another object of this invention is to enable each participant in the communications net to be able to easily transmit entities of interest to the other participants of the net by touching the display at the entities' location on the map and causing a symbol to be entered and then entering the entities' category information.

And yet another object of this invention is to provide for initiating a cellular phone telephone call to another phone by touching the other phone's symbol on the screen of the cellular phone, which automatically activates the telephone call.

And yet another object of this invention is to provide a cellular phone network that provides for instant conference calling among a plurality of cellular phones by touching the screen of specific symbols for initiating the calls.

And yet another object of this invention is to provide a cellular phone network that provides for instant conference voice, text, photographs and video exchange by pre-establishing conferencing sub-nets and the subsequent activation of one of those sub-nets to establish a conference call.

And yet still another object of this invention is to provide a cellular phone that allows for remote alarm activation on another cellular phone to cause a remote cellular phone to make verbal announcements, display images, place return calls, place calls to another phone number, vibrate, change sound intensity and process and display pre-stored data, images and video.

In accordance with these and other objects which will become apparent hereinafter, the instant invention will now be described with particular reference to the accompanying drawings.

DETAILED DESCRIPTION

Figure 1:
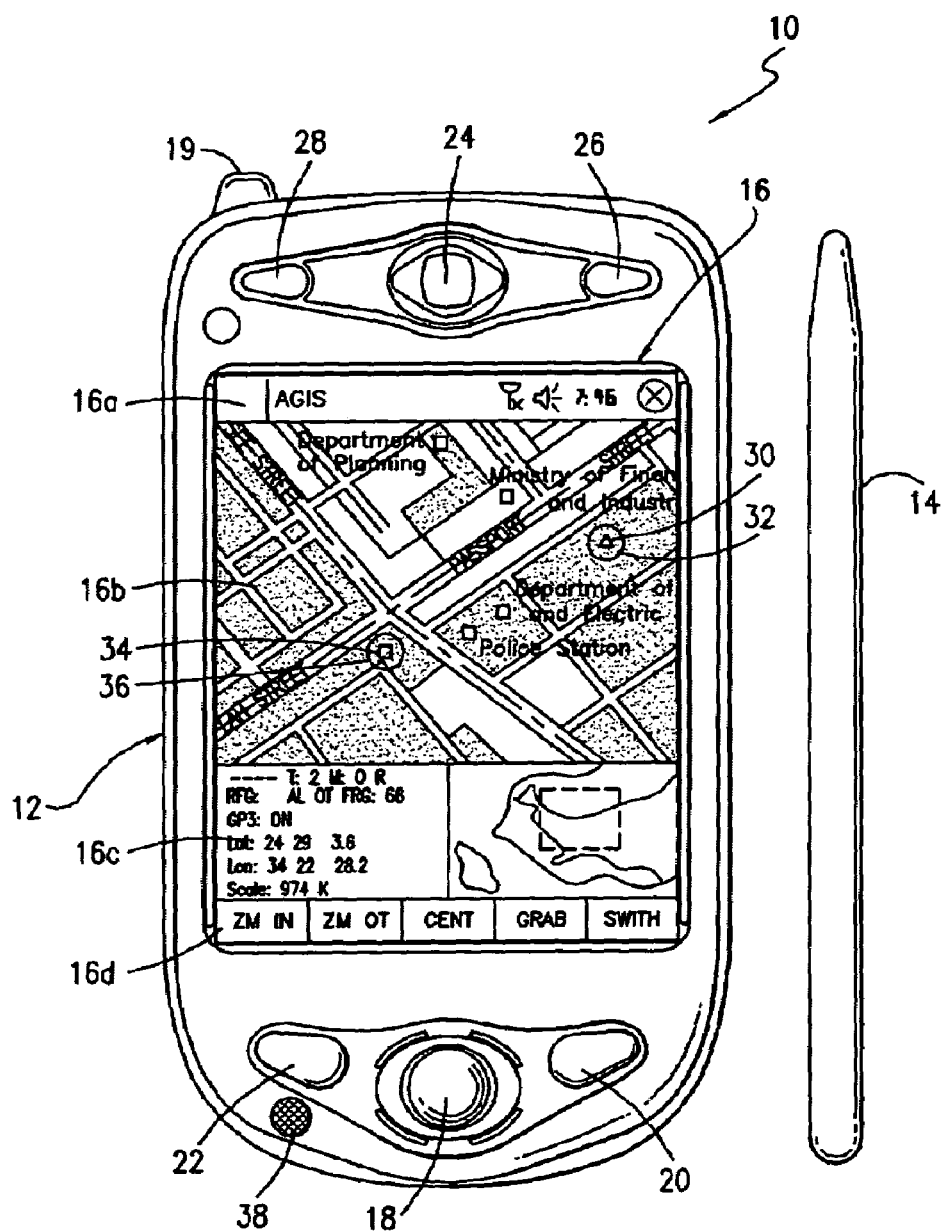
FIG. 1 shows a front plan view of a cellular phone/PDA and display in accordance with the present invention.

Referring now to the drawings and, in particular, FIG. 1, the present invention is shown generally at 10 that includes a small handheld cellular phone/PDA communications system in housing 12 that includes an on/off power switch 19, a microphone 38, and an LCD display 16 that is also a touch screen system. The small area 16a is the Navigation Bar that depicts the telephone, GPS and other status data and the active software. With the touch screen system, the screen symbols are entered through GPS inputs or by the operator using a stylus or finger 14 by manipulatively directing the stylus or finger 14 to literally touch display screen 16. The soft switches displayed on the screen are likewise activated by using a stylus or finger 14 and physically and manipulatively directing the stylus or finger to literally touch display screen 16. The display x, y coordinates of the touched point are known by a CPU in the PDA section of the communication system that can coordinate various information contained in the PDA portion relative to the x, y coordinate position on the screen. Inside housing 12 is contained the conventional cellular phone elements including a modem, a CPU for use with a PDA and associated circuitry connected to a speaker 24 and a microphone 38. A GPS navigational system that can determine the latitude and longitude of the cellular phone can be internal or external to the housing 12. PDA/cellular phone units such as these are currently on sale and sold as a complete unit (or with an external connected GPS) that can be used for cellular telephone calls and sending cellular SMS and TCP/IP or other messages using the PDA's display and computer. The GPS system is capable of determining the latitude and longitude and through SMS, TCP/IP, WiFi or other digital messaging software, to also transmit this latitude and longitude information to other cellular phones via cellular communications, WiFi or radio. The unit includes a pair of cellular phone hardware activating buttons 20 to turn the cellular phone on and 22 to turn the cellular phone off. Navigation Pad actuator 18 is similar to a joy or force stick in that the actuator 18 manually provides movement commands that can be used by the PDA's software to move a cursor. Switches 26 and 28 are designed to quickly select an operator specified software program. Device 24 is the system's speaker. Device 38 is the system's microphone. Switch 19 at the top left of the unit is the power on and power off switch.

The heart of the invention lies in the software applications provided in the system. Mounted inside housing 12 as part of the PDA is the display function screen and the CPU. The CPU includes databases that provide for a geographical map and georeferenced entities that is shown as display portion 16b that includes as part of the display various areas of interest in the particular local map section.

When looking at display 16, the software switches which appear at the very bottom of the display 16d are used to control many of the software driven functions of the phone. The software drawn and controlled switches are activated through the operator's use of the Navigation Pad 18, or a small track ball, force stick or similar hardware pointing device. Alternatively, the operator may chose to activate the software switch matrix by touching the screen with his finger or stylus at the switches' locations. When some of the software switches are activated, it will cause yet different software switches to appear. The bar display 16d shows the software switches "ZM IN, (zoom in)" "ZM OT (zoom out),", "CENT (center)" "GRAB, (pan/grab)" at the bottom of the screen. These software switches are for the operator to perform these functions. The "SWITH (switch)" software switch at the lower right causes the matrix of layered software switches to appear above the bottom row of switches. Through use of the software switches, one can also manipulate the geographical map or chart display. When looking at FIG. 1, permanent geographical locations and buildings are shown. For example, the police station is shown and when the symbol is touched by the stylus or finger, the latitude and longitude of the symbol's location, as shown in display section 16c, is displayed at the bottom left of the screen. The bottom right side of display 16c is a multifunction inset area that can contain a variety of information including: a) a list of the communication link participants; b) a list of received messages; c) a map, aerial photograph or satellite image with an indication of the zoom and off set location of the main map display, which is indicated by a square that depicts the area actually displayed in the main geographical screen 16b; d) applicable status information; and e) a list of the communication net participants.

Also shown on the display screen 16, specifically the geographical display 16b, is a pair of different looking symbols 30 and 34, a small triangle and a small square, which are not labeled. These symbols 30 and 34 can represent communication net cellular phone users in the displayed geographical area that are part of the overall cellular phone communications net used in this invention wherein each of the users has a similar cellular phone to the one shown in FIG. 1. The latitude and longitude of symbol 30 is associated within a database along with a specific phone number. The screen display 16b, which is a touch screen, provides x and y coordinates of the screen 16b to the CPU's software. The software has an algorithm that relates the x and y coordinates to latitude and longitude and can access a communications net participant's symbol or an entity's symbol as being the one closest to that point. In order to initiate a telephone call to the cellular phone user represented by symbol (triangle) 30 at a specific GPS provided latitude and longitude which has been sent to the cellular phone shown in FIG. 1, the operator or initiator of what we call cellular phone one in FIG. 1 can take the stylus or finger 14, touch the triangle 30 with the stylus or finger, and then touch a "call" software switch from a matrix of displayed switches that will overlay the display area 16c and immediately the cellular phone one will initiate a cellular phone telephone call to the cellular phone user at the location shown that represents symbol 30. A second cellular phone user is represented by symbol 34 which is a small square but could be any shape or icon to represent an individual cellular phone unit in the display area. The ring 32 around symbol 30 indicates that the symbol has been touched and that a telephone call can be initiated by touching the soft switch that says "call." When this is done, the telephone call is placed. Another type of symbolic display can indicate that the call is in effect. Furthermore, the operator of cellular phone one can call the police station or other locations, buildings, or facilities (whose phone numbers are stored in the database) by touching them on the display screen using the stylus or his finger and then the call switch. Additionally, the operator can touch both symbol 34 and symbol 30 and can activate a conference call between the two cellular phones and users represented by symbols 30 and 34. Again, a symbolic ring around symbol 34 indicates that a call has been initiated.

The system shown in FIG. 1 can also initiate a telephone conference call for a small number of phones using a stylus or finger contact to touch all the displayed symbols on display 16 that the initiator desires to conference and then selecting the conference call soft switch. The operator can also pre-establish a conference sub-net that the operator desires to be able to rapidly call. The operator performs this task by touching the symbols or by selecting participants from a list or a matrix of the participant addresses and assigning the participants to a net software switch. When the operator desires to place a conference call to these participants, the operator simply touches the net soft switch associated with this group. Software is provided in the unit that mimics setting up a normal small conference call from "phone one" to each of the cellular phones the user had indicated by touching their symbols or selecting their sub-net soft switch on the screen. Once the first call is complete, the party will be automatically put on hold and other callers will be called or answered in sequence and put on hold until all the parties are on line at which time the conference call will be announced at each phone. As each participant is called, the phone will announce that a conference call requested by cellular phone one is in progress. This will all be done by software.

If a conference call is desired that includes more than a small number of phone users, the use of an 800 number conferencing service is required. The initiator or operator of cellular phone one would select the "conference 800" call software switch and then use the stylus or finger to touch the cellular phone users' symbols to whom the calls are to be placed. For example, 50 users are desired on a conference call. The cellular phone would send out a SMS or TCP/IP message to all of the cellular phone displays that requests each cellular phone to call an 800 number (the given number for a conference call) to conference with cellular phone one. Each individual cellular phone user at that point in time would then be verbally notified that a conference call was requested. When the user selected the "accept" software switch, the phone would then call the 800 number and enter its conference participant code.

Another feature available in the cellular phone/PDA system shown in FIG. 1 is its ability to activate a remote cellular phone to make verbal announcements, display images, place return calls, place calls to another phone number, vibrate, change sound intensity and process and display pre-stored data, images and video. As an example, on the PDA screen display 16, a software switch will be provided that would allow cellular phone one to call in an emergency situation and that would basically initiate an emergency audio response call. Using the stylus or finger again, a symbol such as 30 would be touched with the stylus or finger indicating a call to be made. The software switch labeled "call" would cause other software switches to appear, one of which would be "call provide emergency audio response" which when touched by the stylus or finger 14 would cause the cellular phone one system to automatically call the telephone number represented by symbol 30. The cellular phone 30 includes software that when it receives the SMS or TCP/IP message, can activate an audio message that announces "emergency please call cellular phone one immediately." The announcement would be done through the cellular phone speaker.

Thus, the system is capable of initiating a cellular phone call by touch only, initiating conference call by touch only and activating a remote cellular phone to announce an emergency and other messages and elicit the audio response in the remote cellular phone by touch only.

Figure 2:
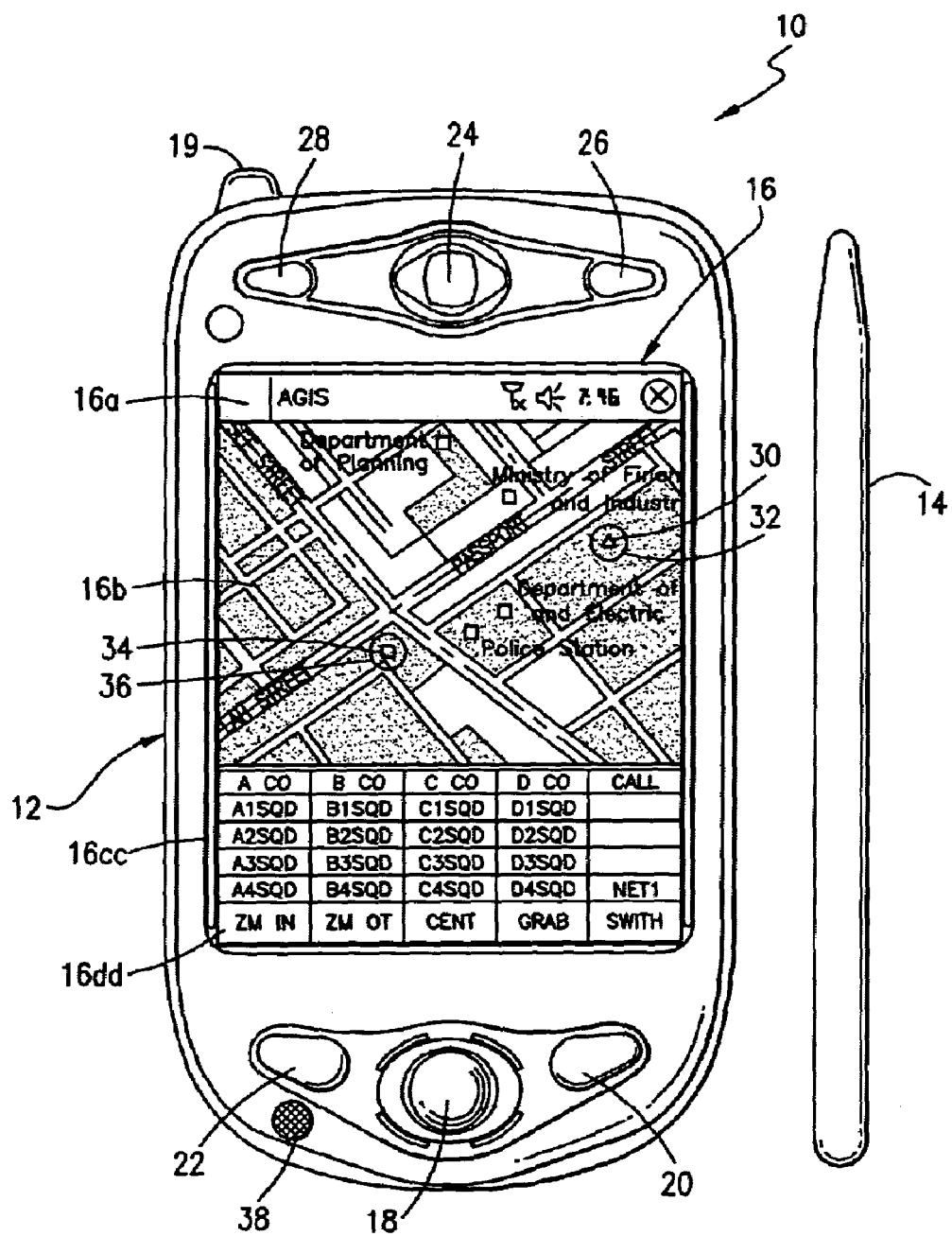
FIG. 2 shows a front plan view of the cellular phone/PDA of FIG. 1 with a different display.

Referring now to FIG. 2, the same cellular phone/PDA 10 is shown with the soft switch matrix displayed at 16*cc* and 16*d*. The cellular phone/PDA is capable of an alternative method of contacting the participants. As shown in FIG. 2 and display 16*cc*, a plurality of squares is displayed having letters and numbers, each square of which indicates a different participant such as "A1SQD." Also, on the right hand side, top line is a switch option called "call." The bottom line 16*dd* shows ZM IN, ZM OUT, CENT, GRAB and SWIT. Using this alternative telephone method, the initiator can touch individual squares, each having a reference to a participant to initiate one call or a conference call with all of the parties. These can also be joined in a single NET 1 as shown. Subsequent phone calls with the particular designated parties or participants established with NET 1 can subsequently be initiated just by touching NET 1 with the stylus or with a finger. The displayed information can be layered with a plurality of "NETS" on a next layer for contacting groups of participants in each NET. This is used in lieu of the screen symbols for conference calls.

Figure 3:
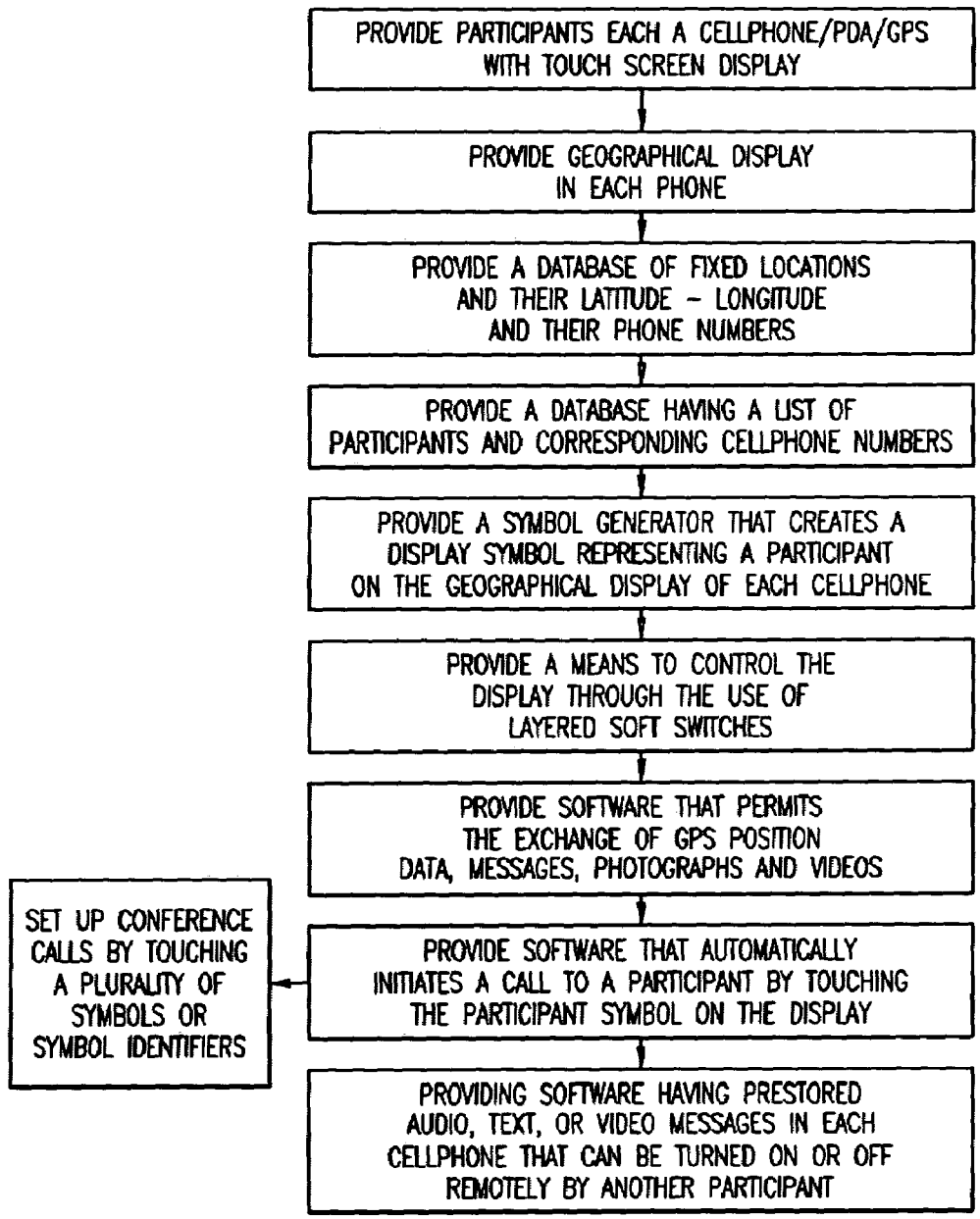
FIG. 3 shows a flow chart of the operation of the present invention.

Referring now to FIG. 3, a flow chart is shown of the activities provided by the present invention and the methodology. First, we provide a cellular phone that includes PDA computer technology and a GPS navigation system that provides to the PDA the location of the cellular phone in latitude and longitude at all times. The cellular phone includes an LCD display with touch screen features for use with a stylus or finger.

The communication device is also given a database that includes a geographical display on the LCD display and software that coordinates the x and y coordinates on the LCD display touch screen with the geographical display. There is also software that places symbols on the geographical display that represent other cellular phone users that are part of the communications net. All the participant's cellular phones that are a part of the communications net include an integrated or electronically connected GPS navigational system. Each phone can call the other cellular phones and request that they broadcast their latitude and longitude locations and status information. Each cellular phone can enter other entities of interest and assign each of them a category (car, person, tank, accident, or other category). The latitude and longitude of each of these entities along with each category is then sent on the communications network. Each phone can also have the latitude and longitude and phone numbers of fixed (geographically referenced fixed locations including: restaurants, gas stations, hospitals, fire departments, military bases, homes, businesses, government facilities, street locations, and the like) are also contained in the data base and displayed on the screen.

Therefore, the present invention can provide a cellular phone PDA GPS system that includes a geographical display that shows one or more other cellular phone users symbolically displayed on the screen and also entered entities that each of the cellular phone users consider to be items of interest, along with pre-established points of interest (geographical referenced fixed locations including: restaurants, gas stations, hospitals, fire departments, military bases, homes, businesses, government facilities, street locations, and the like).

The present invention also includes a database that has the specific cellular phone telephone numbers of each of the displayed symbols thus providing a relationship between the symbol, its location on the geographical screen and the stored memory phone number.

There is also a software program that allows the operator of cellular phone one to touch one of the symbols representing a phone user on the display screen and to initiate a call by touching the appropriate switch with a stylus or finger at which time the software will automatically retrieve the designated symbolic phone telephone number from memory and will initiate instantly a telephone call to the cellular phone number that is associated with the symbol. This is all done by merely touching the symbol representing the phone in the database and touching the "call" soft switch.

In addition, with multiple cellular phone users present, the operator of cellular phone one can use the stylus or finger and touch more than one cellular phone user's symbol and then touch a software switch that says "conference call" wherein the software will initiate and establish conference calls with all of the designated cellular phone users by the touch of a stylus or finger or by selecting a pre-established participant conference net switch. In the event that there are more than a small number of phone users in the area that need to be established on a conference call, because of the technological limitations of conference calls on cellular phones, the system will send a different message that causes the remote cellular phone to call a specific 800 conference number that can establish a much larger number of conference callers. Thus, if the user selects to conference more than an established number of phone users for a conference call, the software will indicate that the 800 number software switch is to be utilized.

In addition the operator of cellular phone one can address text messages, photographs and video for transmission to one or more net participants by either touching their symbols and selecting the appropriate soft switch or selecting the appropriate call net.

Another important feature of the present invention is that the operator or initiator of cellular phone one can by touching a switch on the display, send through the PDA system, a signal and digital message to all the cellular phones in the communications net or to designated cellular phone(s), represented by their symbols on the geographic display, an emergency message which requires a response. When received, the software in the remote cellular phone causes the remote cellular phone to initiate an audio message to the cellular phone user that there is an emergency (or another message) and to call the initiator immediately. This is accomplished by the message sent from cellular phone one to the software in the remote cellular phone(s).

In summary, the present invention provides for expeditious data exchange and cellular phone calls to one or more users by merely touching the display screen location of a remote cellular phone user's symbol to initiate the call. Other features include conference calling by stylus or finger and a rapid emergency remote activation and causing a remote phone to: annunciate various pre-established messages, execute text to speech software, increase its volume level, vibrate, show photographs, or show videos.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of providing a cellular phone communication network for designated participating users, each having a similarly equipped cellular phone that includes a CPU, GPS navigational system and a touch screen display comprising the steps of:
    a) providing for the selective polling of position and status information from one user among all of the other users equipped with cellular phone/PDA/GPS system and its associated software;
    b1) providing for the entering of other entities of interest into the cellular phone CPU and assigning the other entities of interest a category;
    b2) providing the latitude and longitude of the entities of interest along with their categories being automatically sent on the communications network;
    c) providing rapid voice call initiation to one or more locations whose phone number is available in a geographical referenced database using the touch screen;
    d) providing rapid voice call initiation to the users of the cellular phone/PDA/GPS network system using the touch screen;
    e) providing rapid transmission of free, operator selected text messages, photographs, and video to another cellular phone using the touch screen;
    f) providing rapid conference calling multiple phones that are contained within the geographical referenced data base; and
    g) providing remote control from one cellular phone/PDA/GPS system to any of the other cellular phone/PDA/GPS system phones, including the ability to control remote cellular phones to make verbal announcements, display images, place return calls, place calls to another phone number, vibrate, change sound intensity and process and display pre-stored data, images and stored video.

2. The method of providing a communication network as in claim 1 including the step of:
    providing in each of the cellular phones a remotely activatable software program for turning the cellular phone on and off and that initiates a signal from the remote cellular phone displaying a pre-stored message and to call the initiating cellular phone; and
    providing software that activates the remote cellular phone causing the remote cellular phone to generate said pre-stored message to the remote cellular phone user.

3. A communication system to provide a cellular phone network for a group of participants, each of the participants having an individual portable cellular phone that includes voice communication, free and operator selected text messages, photographs and video, a CPU and a GPS navigational system that can accurately determine the location of each cellular phone, each of the cellular phones in the communications net of participants containing:
    said CPU and memory;
    a touch screen display;
    symbol generator in said CPU that can generate symbols that represent each of the participants' cell phones in the communication network on the display screen;
    a database that stores the individual telephone numbers related to each of the symbols each of which represents a participant in the communication network;

cellular phone call initiating software in said CPU connected to the telephone number database and the touch screen and the symbols on the touch screen whereby touching an individual symbol will automatically initiate a cellular phone telephone call to the user represented by the symbol that includes said voice communication, free and operator selected text messages, photographs and video; and said display including databases that display geographical information that includes showing the geographical location of each of the symbols representing participants in the communication network, fixed locations, and entered items of interest.

4. A communication network that includes said participants, as in claim 3 further comprising:

said software for automatically initiating a cellular phone call to a user represented by a symbol includes initiating a conference call to two or more of the participants from a base phone by touching the specific symbols of those participants that will be participating in a conference call by touching the symbol of each of those users and providing a software switch to initiate the conference call by touching the screen whereby each of the initiated conference participants will be called by the base phone to establish a conference call.

5. A communication network as in claim 4 whereby the communication network can include a large number of participants in a conference call comprising:

conference call initiating software in said CPU that is made by sending a digital message to the remote cellular phones from said phone, by touching the symbol of each of the participants, of an 800 number and a participant code that cause each of the participants to call the 800 number and to enter a participant code to establish the conference call with the said phone.

6. A communication network as in claim 3 comprising:

said CPU including a software program to initiate a call to one of the participants represented by a symbol on said touch screen in conjunction with a software switch displayed on said touch screen and software to initiate the cellular phone call automatically that turns the remote cellular phone on or off and generates in the receiving remote cellular phone a pre-stored message that alerts the remote cellular phone user to call the initiator.

7. A method of establishing a cellular phone communication network for designated participants, each having a similarly equipped cellular phone that includes voice communication, free and operator selected text messages, photograph and video, a CPU, a GPS navigation system and a touch screen display comprising the steps of:

a) generating one or more symbols on the touch display screen, each representing a different participant that has a cellular phone that includes said voice communication, free and operator selected text messages, photograph and video, a CPU, said GPS system and a touch screen display;

b) providing and storing in each of the participant cellular phones one or more cellular phone telephone numbers, each cellular phone number of which relates to a different symbol of each of the participants in the communication network;

c) providing initiating cellular phone calling software in each cellular phone that is activated by touching a symbol on the touch display that automatically initiates a cellular phone call using the stored cellular phone number to the participant represented by the symbol; and d) generating a geographical location chart on said display screen to show the geographical location of each of the symbols representing the participants in the communication network by latitude and longitude.

8. The method of establishing a communication network as in claim 7 comprising the additional step of:

e) providing conference call initiating software that allows each of the participants to initiate a conference call to other participants by touching each of the symbols on the touch screen representing participants who will participate in the conference call.

9. A method of establishing a communication network as in claim 7 including the step of:

f) providing conference call initiating software for a large number of participants represented by the symbols on the touch screen in which each of the proposed conference call participants are established by touching the participant's symbol on the screen which causes the cellular phone initiating the conference call to transmit messages to each of the users represented by the touched symbols that tells each of the called participants through their cellular phones to call a particular 800 number to establish the conference call.

10. A cellular phone for use in a communication network for a plurality of participants comprising:

a cellular phone transmitter and receiver for transmitting and receiving voice communication, free and operator selected text messages, photographs, and video;

a small hand held portable housing containing said cellular phone transmitter and receiver;

a touch display screen mounted in said housing;

a modem connected to said cellular phone transmitter and receiver;

a CPU connected to said cellular phone transmitter and receiver;

a GPS navigation system connected to said CPU and to said cellular phone transmitter and receiver on said touch screen;

a database connected to said CPU that includes of a list of telephone numbers that relate to specific symbols;

a symbol generator connected to said CPU and said database for generating symbols on said touch display screen;

CPU software for selectively polling other participants with a cellular phone;

call initiating software connected through said CPU and said telephone database and said symbol generator whereby when a user touches the symbol displayed on a said touch display screen the cellular phone call is automatically initiated to the cellular phone represented by the symbol; and a geographical database connected to said CPU to provide a geographical display on said touch screen representing a defined geographical area that also displays symbols representing each of the participants by latitude and longitude.

11. A cellular phone as in claim 10, including:

conference call initiating software connected to said CPU that allows the cellular phone user to initiate a conference call to a plurality of participants represented by symbols by touching each of the symbols and initiating a conference call software switch.

12. A cellular phone as in claim 10, including:
conference call initiating software for large number of conference call participants that allows the user of the cellular phone to initiate a conference call to the cellular phone users represented by the symbols on the screen by touching each of the symbols representing a participant in the conference call which initiates an automatic cellular phone call to the remote cellular phone users represented by the symbols displaying a text message to call a particular 800 number to establish the conference call.

13. A cellular phone as in claim 12, including:
providing the ability to pre-establish phone conferencing nets by touching the said touch display screen at a symbolic representation of the person(s) location or by selecting the parties from a list appearing on the touch display screen and assigning them to a software drawn switch made to appear on a touch display screen; and
providing the ability to conference the participants previously assigned to a net by using a software drawn switch(es) for a conference call, whereby the user touches the net software switch to initiate the call to all of the participants on the net.

14. A layered set of software drawn switches as in claim 13, including:
a matrix of layered software drawn switches so that each switch that when activated on the touch display screen overlays the previously drawn matrix of switches, the matrix level of which is noted in one of the switch locations, thus providing the operator a large choice of switches in the same physical space on the touch display screen and informing the operator of the level of switches that are displayed.

15. A cellular phone as in claim 10, including:
an emergency call initiating software connected to said CPU that includes a remote cellular phone activating signal for causing a remote cellular phone that is called by touching a symbol representing the cellular phone to be called to generate and play an audio message telling the remote cellular phone user that there is an emergency and to call the cellular phone initiator.

* * * * *

UNITED STATES PATENT AND TRADEMARK OFFICE
CERTIFICATE OF CORRECTION

PATENT NO. : 7,031,728 B2
APPLICATION NO. : 10/711490
DATED : April 18, 2006
INVENTOR(S) : Malcolm K. Beyer, Jr.

It is certified that error appears in the above-identified patent and that said Letters Patent is hereby corrected as shown below:

Column 1, Line 37, should read
"Digital SMS (Short Message Service) and TCP/IP mes-..."

Column 5, Line 35, should read
"...enter each individual phone's participant code. The originator..."

Column 13, Line 43, should read
"...remote cellular phone's software on or off and generates in the..."

Signed and Sealed this

Eighth Day of April, 2008

JON W. DUDAS
*Director of the United States Patent and Trademark Office*